(12) United States Patent
Kitano et al.

(10) Patent No.: US 10,766,184 B2
(45) Date of Patent: Sep. 8, 2020

(54) SEAT COVERING MATERIAL, METHOD FOR MANUFACTURING THE SEAT COVERING MATERIAL, AND EMBOSSING ROLL

(71) Applicant: Suminoe Textile Co., Ltd., Osaka (JP)

(72) Inventors: Masahisa Kitano, Nomi (JP); Daisuke Sawada, Osaka (JP); Toshikazu Kunida, Nomi (JP)

(73) Assignee: SUMINOE TEXTILE CO., LTD., Osaka (JP)

( * ) Notice: Subject to any disclaimer, the term of this patent is extended or adjusted under 35 U.S.C. 154(b) by 360 days.

(21) Appl. No.: 15/527,242

(22) PCT Filed: Nov. 18, 2014

(86) PCT No.: PCT/JP2014/080557
§ 371 (c)(1),
(2) Date: May 16, 2017

(87) PCT Pub. No.: WO2016/079816
PCT Pub. Date: May 26, 2016

(65) Prior Publication Data
US 2017/0334127 A1    Nov. 23, 2017

(51) Int. Cl.
*B29C 59/04* (2006.01)
*B60N 2/58* (2006.01)
*D06C 23/04* (2006.01)

(52) U.S. Cl.
CPC ............ *B29C 59/04* (2013.01); *B29C 59/046* (2013.01); *B60N 2/5891* (2013.01); *D06C 23/04* (2013.01)

(58) Field of Classification Search
CPC ............ B29C 59/046; B29C 2043/463; B29C 44/5627; B29C 44/5636; D06C 23/04; B60N 2/5891
See application file for complete search history.

(56) References Cited

U.S. PATENT DOCUMENTS

| | | | |
|---|---|---|---|
| 2003/0028165 A1* | 2/2003 | Curro | A47L 1/15 604/378 |
| 2006/0286885 A1† | 12/2006 | Schuh | |
| 2014/0044923 A1† | 2/2014 | Gelli | |

FOREIGN PATENT DOCUMENTS

| | | | |
|---|---|---|---|
| JP | 52-34904 A | | 3/1977 |
| JP | 5699623 A | † | 8/1981 |
| JP | S5699623 A | † | 8/1981 |
| JP | S63-135236 | | 6/1988 |
| JP | H4-505107 A | | 9/1992 |

(Continued)

OTHER PUBLICATIONS

Machine Translation of JP S56-99623 (Year: 1981).*

(Continued)

*Primary Examiner* — Leith S Shafi
(74) *Attorney, Agent, or Firm* — Brandon V. Zuniga; James R. Gourley; Carstens & Calhoun, LLP

(57) ABSTRACT

A heating embossing roll has a base surface on which a plurality of embossing portion is formed. An elongated material passes between the heating embossing roll and a heating flat roll so that the elongated material is pressed by the embossing portions of the heating embossing roll. The embossing portion is formed to have a height from the base surface that varies by section.

7 Claims, 8 Drawing Sheets

(56) References Cited

FOREIGN PATENT DOCUMENTS

| JP | 2004314344 A | † | 11/2004 |
|---|---|---|---|
| JP | 2007-276285 A | | 10/2007 |
| JP | 2007276285 A | † | 10/2007 |
| JP | 2013-59881 A | | 2/2012 |
| JP | 2014-70321 A | | 4/2014 |
| JP | 2014-184580 A | | 10/2014 |
| JP | 2014184580 A | † | 10/2014 |

OTHER PUBLICATIONS

English translation of International Preliminary Report on Patentability for International Application No. PCT/JP2014/080557 (5 pages).
First Office Action for Chinese Patent Application No. 201480083413.9 dated Jul. 18, 2018 with English translation (17 pages).
Exhibit 1 filed against Japanese Patent No. 5913755 on Jun. 5, 2018: Photographs and drawings of the design master, made open to the public on Dec. 2, 2004 (4 pages).
Exhibit 2 filed against Japanese Patent No. 5913755 on Jun. 5, 2018: Record of meeting for quantity production of part No. "FORMA", made open to the public on May 23, 2005 (2 pages).
Exhibit 3 filed against Japanese U.S. Pat. No. 5913755 on Jun. 5, 2018: Commercial sample of part No. "FORMA", made open to the public on May 23, 2005 (2 pages).
Exhibit 4 filed against Japanese Patent No. 5913755 on Jun. 5, 2018: Record of meeting for quantity production of part No. "FORMA", made open to the public on May 24, 2005 (2 pages).
Exhibit 5 filed against Japanese Patent No. 5913755 on Jun. 5, 2018: Check-sheet of early processed product of the part No. "FORMA", date made open to the public unknown (2 pages).
Exhibit 6 filed against Japanese Patent No. 5913755 on Jun. 5, 2018: Memorandum on the launch of the new product, made open to the public on Jan. 16, 2005 (2 pages).
Exhibit 7 filed against Japanese Patent No. 5913755 on Jun. 5, 2018: Standard work chart of Part No. "FORMA", made open to the public on Jan. 16, 2005 (2 pages).
Exhibit 8 filed against Japanese Patent No. 5913755 on Jun. 5, 2018: Process design (process instructions) of part No. "FORMA", made open to the public on Jun. 14, 2005 (2 pages).
Exhibit 9 filed against Japanese Patent No. 5913755 on Jun. 5, 2018: Process design (process instructions) of part No. "FORMA", made open to the public on Jun. 14, 2005 (2 pages).
Exhibit 10 filed against Japanese Patent No. 5913755 on Jun. 5, 2018: Process design (process instructions) of part No. "FORMA", made open to the public on Jun. 14, 2005 (2 pages).
Exhibit 11 filed against Japanese Patent No. 5913755 on Jun. 5, 2018: Drawings of vehicle seat of which vehicle No. is "364", made open to the public on Dec. 20, 2014 (7 pages).
Exhibit 12 filed against Japanese Patent No. 5913755 on Jun. 5, 2018: Production schedule sheet of the part No. "FORMA", date made open to the public unknown (3 pages).
Exhibit 13 filed against Japanese Patent No. 5913755 on Jun. 5, 2018: Facsimile document dated Jun. 22, 2005, made open to the public on Jun. 22, 2005 (2 pages).
Exhibit 14 filed against Japanese Patent No. 5913755 on Jun. 5, 2018: Journal for Company B to which "FORMA" was supplied, made open to the public on Sep. 30, 2005 (12 pages).
Exhibit 15 filed against Japanese Patent No. 5913755 on Jun. 5, 2018: Processing data sheet for "FORMA P" between Jul. 2005 and Feb. 2006, date made open to the public unknown (6 pages).
Exhibit 16 filed against Japanese Patent No. 5913755 on Jun. 5, 2018: Facsimile document dated Dec. 21, 2006, made open to the public on Dec. 21, 2006 (2 pages).
Exhibit 17 filed against Japanese Patent No. 5913755 on Jun. 5, 2018: Catalog for the car model "Lafesta", made open to the public at issuance of Jul. 2008 (7 pages).
Exhibit 18 filed against Japanese Patent No. 5913755 on Jun. 5, 2018: Web catalog on the car model "Lafesta" posted between Dec. 2004 and May 2007 (7 pages).
Exhibit 19 filed against Japanese U.S. Pat. No. 5913755 on Jun. 5, 2018: Authentic document, made open to the public on May 30, 2018 (53 pages).
Exhibit 20 filed against Japanese Patent No. 5913755 on Jun. 5, 2018: Sample book of seat covering issued from Sangetsu Corporation, made open to the public at issuance of May 2011 (8 pages).
Exhibit 21 filed against Japanese Patent No. 5913755 on Jun. 5, 2018: Web catalog of the sample book of seat covering, made open to the public on May 2011 (5 pages).
Exhibit 22 filed against Japanese Patent No. 5913755 on Jun. 5, 2018: News Release presented by Sangetsu Corporation, made open to the public on May 17, 2011 (4 pages).
Exhibit 23 filed against Japanese Patent No. 5913755 on Jun. 5, 2018: News Release disclosed by Interior Information Planning, made open to the public on May 17, 2011 (3 pages).
Exhibit 24 filed against Japanese Patent No. 5913755 on Jun. 5, 2018: Web catalog of sample book of seat clothing, made open to the public from posting in 2016 (5 pages).
Exhibit 25 filed against Japanese Patent No. 5913755 on Jun. 5, 2018: Photo images of sample of seat clothing, made open to the public on Dec. 4, 2017 (3 pages).
Exhibit 26-1 filed against Japanese Patent No. 5913755 on Jun. 5, 2018: Request paper for requesting to send the sample, date made open to the public unknown (2 pages).
Exhibit 26-2 filed against Japanese Patent No. 5913755 on Jun. 5, 2018: Invoice attached to the sample and catalog, late made open to the public unknown (2 pages).
Exhibit 29 filed against Japanese Patent No. 5913755 on Jun. 5, 2018: Statement, date made open to the public unknown (5 pages).
Exhibit 30 filed against Japanese Patent No. 5913755 on Jun. 5, 2018: Specification of gray fabric No. "PX FUOMA", date made open to the public unknown (2 pages).
Exhibit 31 filed against Japanese Patent No. 5913755 on Jun. 5, 2018: Photo images of a rear surface of the design master, made open to the public on May 24, 2005 (5 pages).
Exhibit 32 filed against Japanese Patent No. 5913755 on Jun. 5, 2018: Knitting chart of the "PX FUOMA", date made open to the public unknown (2 pages).
Exhibit 33 filed against Japanese Patent No. 5913755 on Jun. 5, 2018: Japanese National Phase Laid-Open Patent Publication No. H4-505107, made open to the public on Sep. 10, 1992 (37 pages).
Exhibit 36 filed against Japanese Patent No. 5913755 on Jun. 5, 2018: Japanese Laid-Open Patent Publication No. S63-135236, made open to the public on Jun. 7, 1988 (22 pages).
Patent Owner's Exhibit 1 filed in invalidation proceeding of Japanese Patent No. 5913755: Web-site provided by Maruya-Textile Co.,Ltd, made open to the public on Sep. 5, 2018 (2 pages).
Patent Owner's Exhibit 2 filed in invalidation proceeding of Japanese Patent No. 5913755: Report of the result of embossing using the sample, made open to the public on Sep. 7, 2018 (5 pages).
Patent Owner's Exhibit 3 filed in invalidation proceeding of Japanese Patent No. 5913755: Report of the result of embossing, made open to the public on Nov. 13, 2019 (17 pages).

\* cited by examiner
† cited by third party

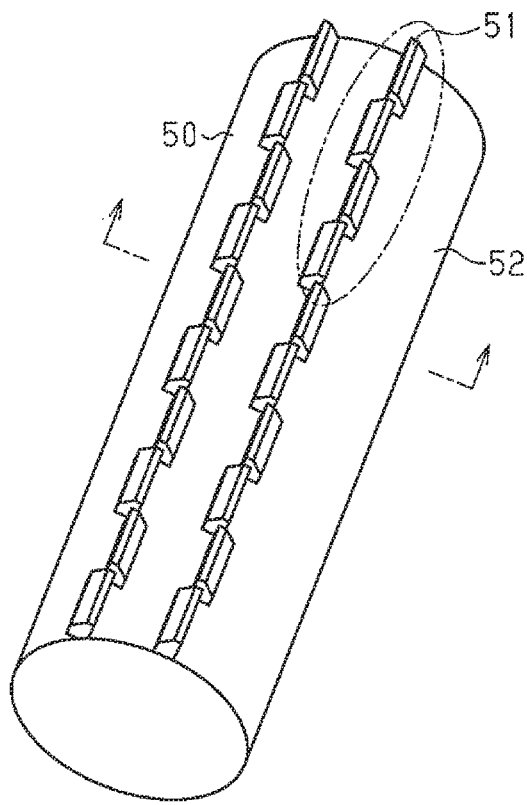
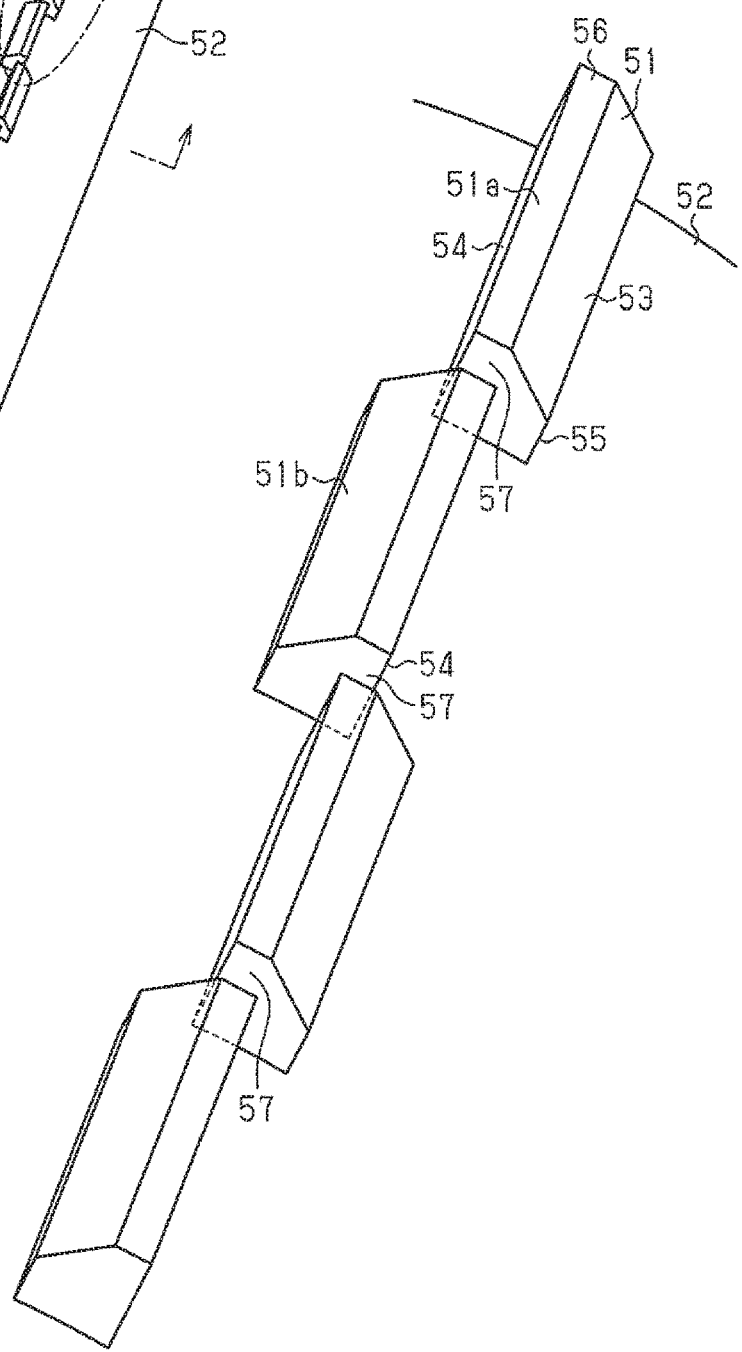

SEAT COVERING MATERIAL, METHOD FOR MANUFACTURING THE SEAT COVERING MATERIAL, AND EMBOSSING ROLL

TECHNICAL FIELD

The present invention relates to a seat covering material having an embossed pattern, a method for manufacturing the seat covering material, and an embossing roll used to manufacture the seat covering material.

BACKGROUND ART

Seats of vehicles, such as automobiles, buses, and trains, and furniture, such as sofas and legless chairs, use seat covering materials that are embossed to form a pattern of projections and depressions in the surface to improve the aesthetic quality. Embossing provides a seat covering material with a three-dimensional surface and a desirable aesthetic appearance. In addition, formation of projections and depressions may enhance the tactile properties.

Patent Document 1 describes a conventional embossing process of seat covering materials. The method disclosed in this document passes a lamination sheet, which includes an outer material and a cushion layer, between a heated embossing roll and a heat roll. This forms an embossed pattern in the surface of the lamination sheet.

FIG. 12 shows an embossing roll 100 that is used in the embossing process described in Patent Document 1. The embossing roll 100 includes a base surface 101 from which a plurality of embossing portions 102 projects in a regular pattern. When a lamination sheet passes between the embossing roll 100 and the heat roll, the embossing portions 102 press the surface of the lamination sheet for predetermined duration and with predetermined pressure. This forms a plurality of deep, clear depressions 201 in the surface of the lamination sheet 200 as shown in FIG. 13A. A three-dimensional pattern of projections and depressions is thus formed in the entire surface of the lamination sheet 200.

The embossing portions 102 projecting from the conventional embossing roll 100 substantially have the shape of a rectangular solid. The embossing portions 102 therefore form an embossed pattern in which depressions, which are rectangular as viewed in a front view, are regularly formed in the surface of the lamination sheet 200. As shown in FIG. 13B, the cross-sectional shape of the lamination sheet 200 is defined only by flat heat-pressed portions 202, which are pressed by the embossing portions 102, and non-heat-pressed portions 203, which are not pressed by the embossing portions 102.

Thus, even though the surface of the lamination sheet 200 includes a three-dimensional embossed pattern, the section having the embossed pattern has a monotonous appearance. Further improvements are needed with respect to the aesthetic appearance of seat covering materials.

PRIOR ART DOCUMENT

Patent Document

Patent Document 1: Japanese Laid-Open Patent Publication No. 2007-276285

SUMMARY OF THE INVENTION

Problems that the Invention is to Solve

It is an object of the present invention to provide a seat covering material having an embossed pattern with a complex three-dimensional appearance, a method for manufacturing the seat covering material, and an embossing roll used to manufacture the seat covering material.

Means for Solving the Problems

In order to meet the object, the first aspect of the present invention provides a method for manufacturing a seat covering material. The manufacturing method includes a step of passing an elongated material between a heating embossing roll, which includes a plurality of embossing portions projecting from a base surface, and a heating flat roll so that the elongated material is pressed by the embossing portions. The elongated material is pressed by the embossing portions, each having a height from the base surface of the heating embossing roll that varies by section.

In this structure, an embossing portion projecting from the heating embossing roll is formed to have a height from the base surface of the heating embossing roll that varies by section. The section pressed by the embossing portion forms a depression that varies in depth by section. Thus, the shape of the depression can be designed flexibly by setting the height of the embossing portion from the base surface as appropriate.

In addition, the shape of the depression is perceived differently when viewed from different angles. This varies the degree of light reflection and shine, allowing the depression to be perceived to have a complex three-dimensional appearance. Further, the plurality of embossing portions projecting from the heating embossing roll forms a plurality of depressions in the surface of the elongated material, allowing the entire surface of the elongated material to have a complex three-dimensional appearance. This achieves a seat covering material with an enhanced aesthetic appearance.

The embossing roll, which includes the embossing portions, and the flat roll are both heated. Thus, the back side of the elongated material is heated in addition to the front side of the elongated material. Thus, even if the temperature of the heating embossing roll is lowered, deep, clear depressions are formed compared to a method that heats only the heating embossing roll. In addition, the surface of the elongated material is less likely to be overheated. This improves the aesthetic quality of the seat covering material.

In the method for manufacturing a seat covering material, the base surface of the heating embossing roll preferably remains out of contact with the elongated material when the elongated material passes between the heating embossing roll and the heating flat roll.

In this structure, the surface of the elongated material includes a section that is not brought into contact with the heating embossing roll. The section of the surface of the elongated material that is not brought into contact with the heating embossing roll reduces the effects of heat on the surface of the elongated material. This improves the aesthetic quality of the seat covering material.

In the method for manufacturing a seat covering material, steps are preferably formed in at least a section of each embossing portion, and the steps have a height from the base surface that varies in a stepwise manner.

In this structure, the steps that are formed in at least a section of the embossing portion reduce the area of the section of the embossing portion that completely presses the elongated material. This enhances the three-dimensional appearance of the embossed pattern. A conventional embossing portion that substantially has the shape of a rectangular solid includes only a section that presses completely and a section that does not press. In contrast, the embossing portion having steps includes a section that gradually varies in degree of pressing and is located between the section that presses completely and the section that does not press. This forms a depression having a gently inclined surface compared to the conventional embossed pattern. This provides variation in the shape of the depression and thus a complex three-dimensional appearance. In addition, the gradient of the gently inclined surface formed in the depression can be easily set by changing the shape of the steps.

In the method for manufacturing a seat covering material, a bevel is preferably formed in at least a section of each embossing portion.

In this structure, the bevel formed in the embossing portion reduces the area of the section of the embossing portion that completely presses the elongated material. This enhances the three-dimensional appearance of the embossed pattern. The embossing portion having the bevel forms a depression having a gently inclined surface compared to the conventional embossed pattern. This provides variation in the shape of the depression and thus a complex three-dimensional appearance. In addition, the gradient of the gently inclined surface formed in the depression can be easily set by changing the inclination angle of the bevel.

In the method for manufacturing a seat covering material, a plurality of embossing portions each preferably includes a bevel that varies in height from the base surface, the plurality of embossing portions preferably includes a group of embossing portions arranged along an imaginary line on the base surface, and the bevels of adjacent embossing portions in the group of embossing portions are preferably inclined in different orientations with respect to the imaginary line.

In this structure, in the group of depressions formed in the surface of the elongated material along the imaginary line, the gently inclined surfaces of adjacent depressions are in different orientations. This achieves a complex three-dimensional appearance.

In the method for manufacturing a seat covering material, the embossing portion preferably includes a depression that varies in height from the base surface.

In the method for manufacturing a seat covering material, the embossing portion preferably includes a projection that varies in height from the base surface.

The structures described above achieve a seat covering material with a more complex three-dimensional appearance.

In order to meet the object, the second aspect of the present invention provides an embossing roll used to manufacture a seat covering material. The embossing roll has a base surface that includes a plurality of embossing portions. The embossing portions have a height from the base surface of the embossing roll, and the height of the embossing portions varies by section.

In this structure, an embossed pattern is achieved in which each depression varies in depth by section. Thus, the shape of the depression can be designed freely by changing the height of the embossing portion. This allows for manufacturing of a seat covering material that has a complex three-dimensional appearance and excellent aesthetic appearance.

In order to meet the object, the third aspect of the present invention provides a seat covering material having an embossed pattern in the surface. The seat covering material includes a heat-pressed portion, which is heated and pressed by a heating embossing roll, and a non-heat-pressed portion, which is not heated or pressed by the heating embossing roll. The heat-pressed portion includes a first heat-pressed portion and a second heat-pressed portion that are adjacent to each other, and the thickness of the second heat-pressed portion is greater than the thickness of the first heat-pressed portion and less than the thickness of the non-heat-pressed portion.

In this structure, the heat-pressed portion includes a first heat-pressed portion and a second heat-pressed portion that have different thicknesses. The section that is heated and pressed by the heating embossing roll includes multiple sections of different thicknesses. This allows for manufacturing of a seat covering material that has desired inclination between the non-heat-pressed portion and the heat-pressed portion.

Effects of the Invention

The present invention provides a seat covering material having an embossed pattern with a complex three-dimensional appearance.

BRIEF DESCRIPTION OF THE DRAWINGS

FIG. 8A is a schematic view showing the overall shape of an embossing roll of a second embodiment.

FIG. 8B is an enlarged partial perspective view showing an end portion of the embossing roll.

MODES FOR CARRYING OUT THE INVENTION

First Embodiment

Referring to FIGS. 1 to 7D, a first embodiment of the present invention will now be described. The first embodiment will be described using an example of a seat covering material (hereinafter referred to as a covering material P) for automobile seats. The covering material P is a long elongated material 1 having a surface embossed to form an embossed pattern.

Figure 1:
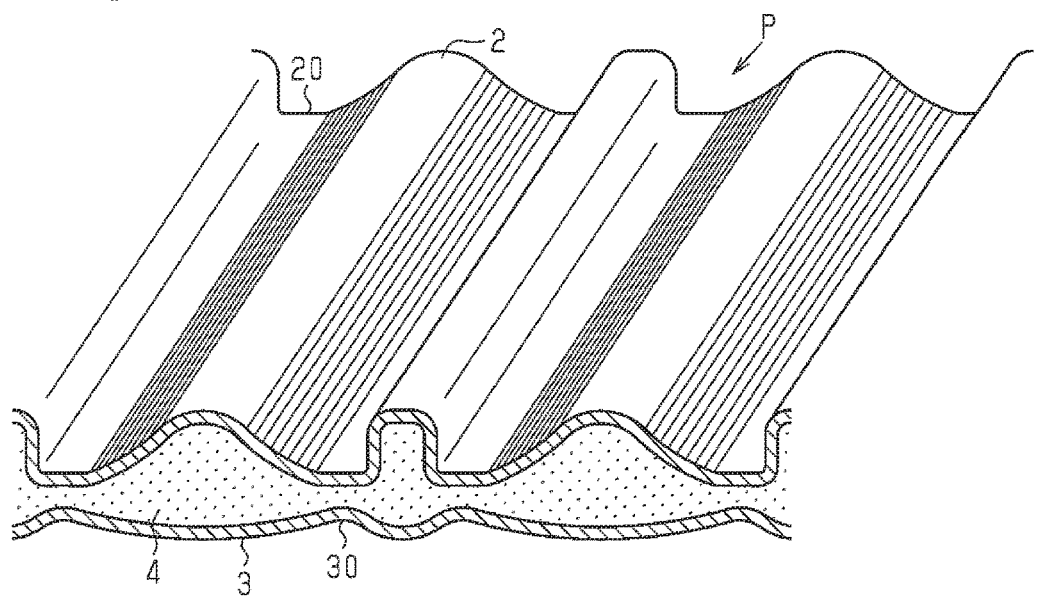
FIG. 1 is a perspective view showing a seat covering material according to a first embodiment of the present invention.

As shown in FIG. 1, the covering material P is a lamination of an outer material 2, a backing material 3, and a cushion material 4, which is sandwiched between the outer material 2 and the backing material 3. The surface of the outer material 2 has an embossed pattern.

The outer material 2 and the backing material 3 may be formed of any material. The material of the outer and backing materials 2 and 3 may be a woven fabric, knitted fabric, nonwoven fabric, or composite thereof. For example, natural fibers, such as cotton, hemp, and silk, regenerated fibers, such as acetate and cuprammonium rayon, or synthetic fibers, such as nylon, polyurethane, and polyester fibers may be used. For example, the outer material 2 may be selected considering the aesthetic appearance of the covering material P, and the backing material 3 may be selected considering the protection of the cushion material 4 inside. The outer material 2 and the backing material 3 may be made of the same material or different materials.

The cushion material 4 may be made of any material that has flexibility suitable for automobile seats. For example, a synthetic resin foam such as polyurethane foam, polystyrene foam, polyethylene foam, polypropylene foam, phenol foam, silicone foam, acrylic foam, and polyimide foam may be suitably used.

The elongated material 1 may have any width, length, and thickness. To form a clear embossed pattern, the thickness is preferably about 3 to 15 mm. In the first embodiment, an embossed pattern is formed in the elongated material 1 having a thickness of about 6 mm.

Figure 2A:
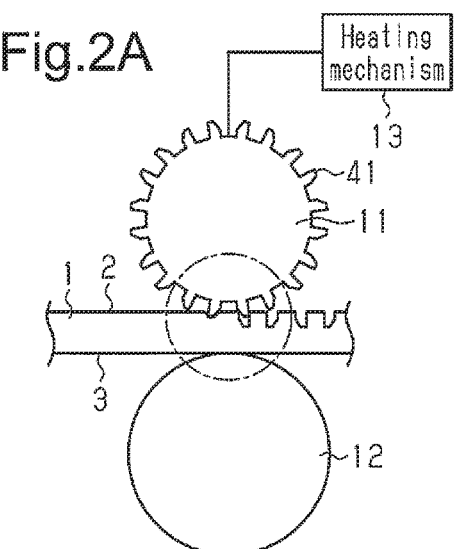
FIGS. 2A and 2B are schematic views illustrating a method for manufacturing a seat covering material.

As shown in FIG. 2A, the covering material P is formed by embossing the elongated material 1 to form an embossed pattern in the surface. The embossing process is performed by passing the elongated material 1 between a rotatable embossing roll 11 and a rotatable flat roll 12, which is opposed to the embossing roll 11. In the embossing process, the outer material 2 of the elongated material 1 faces the embossing roll 11, and the backing material 3 of the elongated material 1 faces the flat roll 12.

Figure 2B:
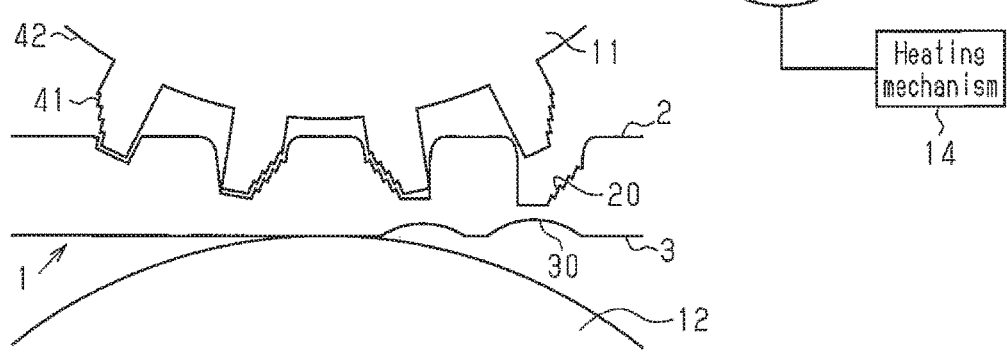
Figure 3A:
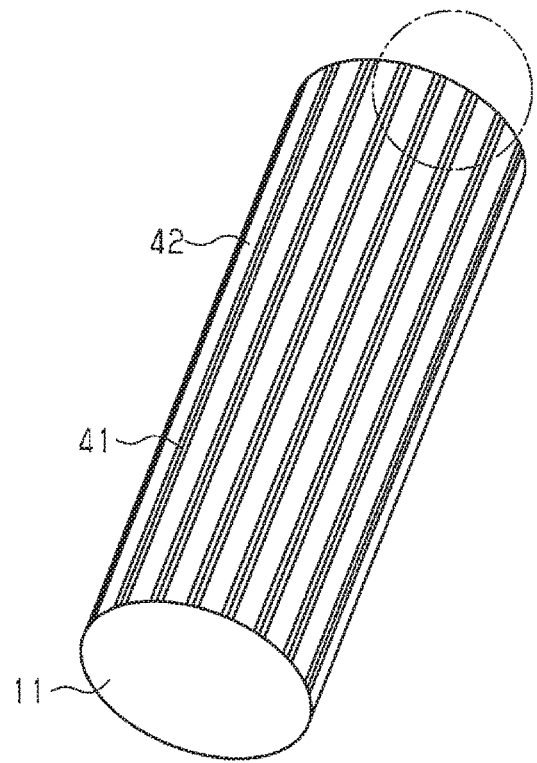
FIG. 3A is a schematic view showing the overall shape of an embossing roll of the first embodiment.

As shown in FIGS. 2B and 3A, each of the embossing roll 11 and the flat roll 12 is cylindrical and has an axial length of about 180 cm and a radius of about 10 cm. The embossing roll 11 has a base surface 42 from which a plurality of embossing portions 41 projects. The embossing portions 41 extend over the entire length in the axial direction. The surface of the flat roll 12 does not have any projection or depression.

As shown in FIG. 2A, the embossing roll 11 and the flat roll 12 are connected to respective heating mechanisms 13 and 14. The heating mechanisms 13 and 14 control the heating temperatures of the embossing roll 11 and the flat roll 12. This allows for individual setting and control of the temperature on the outer material 2 of the elongated material 1 and the temperature on the backing material 3. The heating temperatures of the embossing roll 11 and the flat roll 12 may be set as appropriate according to the materials of the outer material 2, the backing material 3, and the cushion material 4 or the shape of projections and depressions in the embossed pattern to be formed.

As shown in FIG. 2B, embossing is performed by passing the elongated material 1 between the embossing roll 11 and the flat roll 12, which are set to respective predetermined temperatures. The positions of the embossing roll 11 and the flat roll 12 are adjusted in advance such that the embossing portions 41 of the embossing roll 11 bite into the surface of the outer material 2 of the elongated material 1 by a predetermined depth and the base surface 42 of the embossing roll 11 is not brought into contact with the surface of the outer material 2 of the elongated material 1. As the elongated material 1 passes between the embossing roll 11 and the flat roll 12, the heating and pressing by the embossing portions 41 of the embossing roll 11 fuse the outer material 2, the backing material 3, and the cushion material 4 together.

Since both the embossing roll 11 and the flat roll 12 are heated, the outer material 2 and the backing material 3 both fuse with the cushion material 4, which compresses the cushion material 4 in the fused section. The heating and the pressing by the embossing portions 41 form depressions 20 in the outer material 2 of the covering material P. In addition, depressions 30 are formed in the backing material 3 in the positions corresponding to the depressions 20 of the outer material 2. The embossing process of the covering material P results in a plurality of depressions 20 formed in the surface of the outer material 2 of the covering material P and a plurality of depressions 30 formed in the surface of the backing material 3, thereby forming the covering material P having an embossed pattern.

The shape and size of the embossing portions 41 projecting from the embossing roll 11 will now be described. However, the shape and size of the embossing portions 41 are not limited to those described below. Embossing may be performed with the shape and size of the embossing portions 41 modified.

Figure 3B:
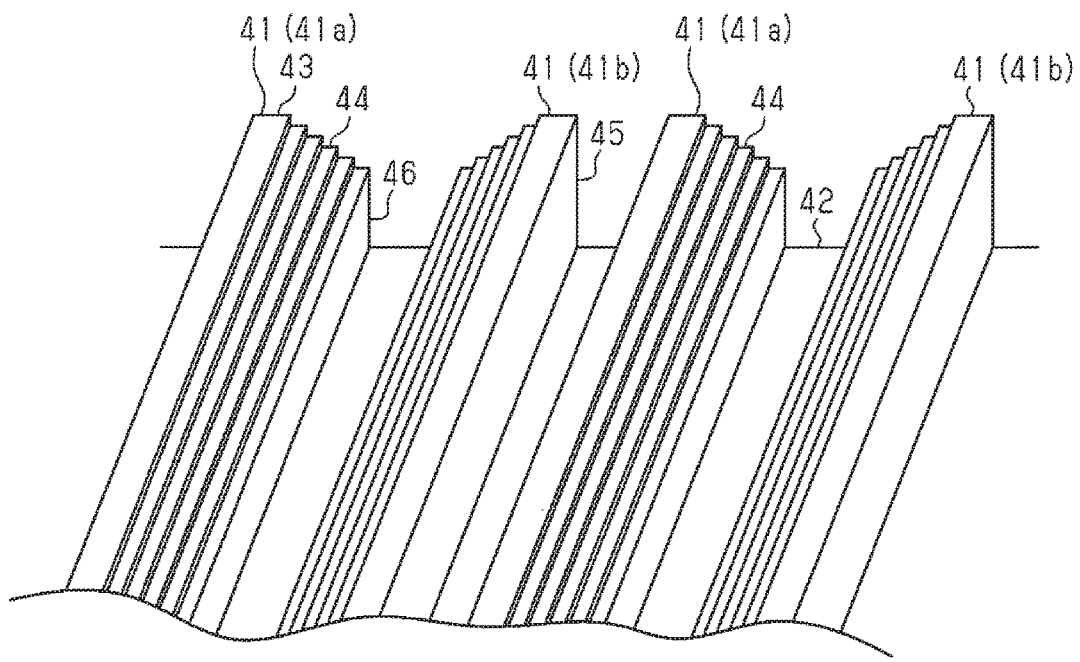
FIG. 3B is an enlarged partial perspective view showing an end portion of the embossing roll.
Figure 4A:
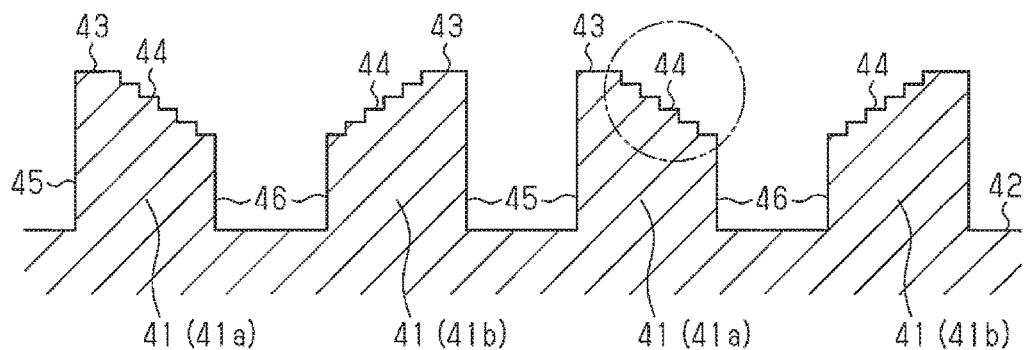
FIG. 4A is an enlarged partial cross-sectional view showing embossing portions of the embossing roll.

As shown in FIGS. 3B and 4A, each embossing portion 41 includes a long-side surface 45 and a short-side surface 46, which extend perpendicularly from the base surface 42 of the embossing roll 11. The section of the embossing portion 41 that is farthest from the base surface 42 forms a flat top surface 43, which is substantially parallel to the base surface 42. In this embodiment, the height of the top surface 43 from the base surface 42 is about 5 mm. The long-side surface 45 is connected to the top surface 43, and five steps 44 are formed between the short-side surface 46 and the top surface 43. Each step 44 extends over the entire length of the embossing portion 41 along the axis of the embossing portion 41.

Figure 4B:
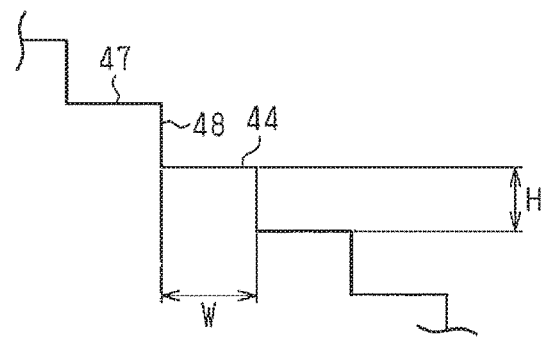
FIG. 4B is an enlarged partial cross-sectional view showing steps formed in an embossing portion.

As shown in FIG. 4B, the five steps 44 are identical in shape and size. Each step 44 includes a bottom surface 47, which is substantially parallel to the base surface 42 of the embossing roll 11, and an elevation surface 48, which is substantially perpendicular to the base surface 42. In this embodiment, the depth W of the bottom surface 47 of each step 44 is about 1 mm, and the height H of the elevation surface 48 is about 0.5 mm. Since the height of the short-side surface 46 is about 2.5 mm and since five steps 44 are formed, the height of the long-side surface 45 is about 5 mm.

As shown in FIGS. 3B and 4A, of the plurality of projecting embossing portions 41, adjacent embossing portions 41 are positioned such that the steps 44 face toward each other. For purposes of illustration, as viewed in FIGS. 3B and 4A, the embossing portions having the steps 44 on the right side are referred to as embossing portions 41a, and the embossing portions having the steps 44 on the left side are referred to as embossing portions 41b. In other words, the steps 44 of adjacent embossing portions 41a and 41b face toward each other, and the long-side surfaces 45 of adjacent embossing portions 41a and 41b face each other.

Figure 5:
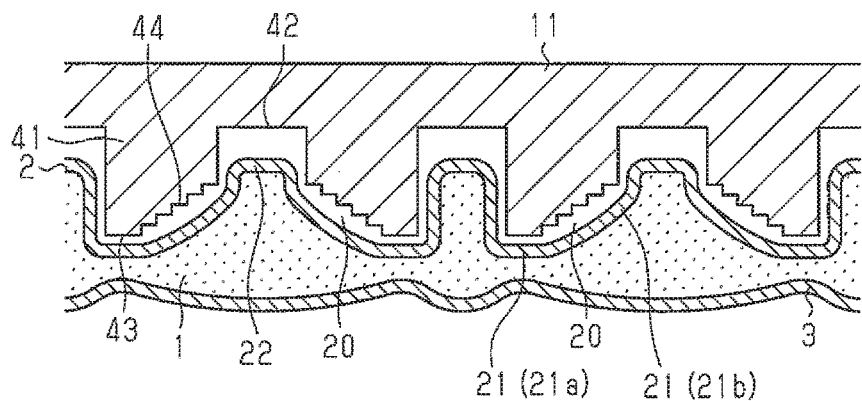
FIG. 5 is a schematic view showing an elongated material pressed by the embossing roll.

As shown in FIG. 5, as the elongated material 1 passes between the embossing roll 11 and the flat roll 12, each embossing portion 41 presses the outer material 2 of the elongated material 1 such that the region of about 4 mm from the top surface 43 of the embossing portion 41 bites into the elongated material 1, for example. Here, a clearance of about 1 mm is created between the base surface 42 of the embossing roll 11 and the outer material 2 of the elongated material 1. The clearance prevents contact between the base surface 42 and the surface of the outer material 2 of the elongated material 1. The pressing by the embossing portions 41 of the embossing roll 11 forms the depressions 20 in the outer material 2 of the elongated material 1.

The embossing roll 11 of the first embodiment includes the steps 44 in the embossing portions 41. The top surfaces 43 of the embossing portions 41 press the outer material 2 of the elongated material 1 with a strong, uniform force. In contrast, the steps 44 of the embossing portions 41 press the outer material 2 of the elongated material 1 with forces that vary according to the height of each step 44. In each depression 20, which is formed by pressing the surface of the outer material 2 of the elongated material 1 with an embossing portion 41, the section that is pressed by the top surface 43 is referred to as a first heat-pressed portion 21a, and the section that is pressed by the steps 44 is referred to as a second heat-pressed portion 21b. The first heat-pressed portion 21a and the second heat-pressed portion 21b are collectively referred to as a heat-pressed portion 21. Further, the section of the surface of the outer material 2 of the elongated material 1 that corresponds to the base surface 42 of the embossing roll 11 and is not pressed is referred to as a non-heat-pressed portion 22.

Figure 6A:
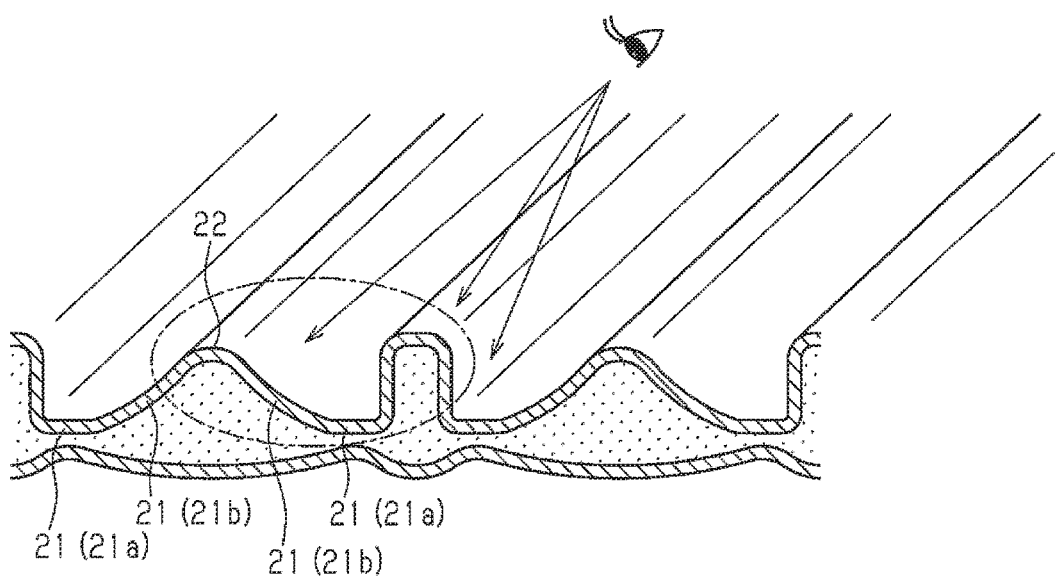
FIG. 6A is a perspective view showing a seat covering material of the first embodiment.

As shown in FIGS. 5 and 6A, each first heat-pressed portion 21a, which is firmly pressed by the top surface 43 of an embossing portion 41, forms the flat bottom surface of the depression 20. The effects of heat from the heated embossing roll 11 and the strong pressing force from the top surface 43 fuse the outer material 2, the backing material 3, and the cushion material 4 together, which reduces the thickness of the elongated material 1.

In contrast, each second heat-pressed portion 21b, which is pressed with less force by the steps 44 of an embossing portion 41, forms an inclined surface, which is a relatively gentle slope, in the depression 20. The effects of heat from the heated embossing roll 11 and the pressing force from the steps 44 cause fusion in the similar manner as the first heat-pressed portion 21a. However, the biting of the embossing portion 41 into the outer material 2 and the pressing force applied to the outer material 2 are reduced in the section where the steps 44 are formed. This results in the second heat-pressed portion 21b having a greater thickness than the first heat-pressed portion 21a. Since the heights of the steps 44 vary gradually, the degrees of resulting fusion also vary gradually. As a result, the second heat-pressed portion 21b forms a gently inclined surface. Accordingly, as shown in FIG. 6A, the depressions 20 of the embossed elongated material 1, or the covering material P, include inclined surfaces having a height that varies by section.

As shown in FIG. 6A, in the section of the surface of the elongated material 1 that is pressed by a section in which the steps 44 of an embossing portion 41a and the steps 44 of an embossing portion 41b face toward each other, second heat-pressed portions 21b, which are gently inclined surfaces, are formed adjacent to each other with a non-heat-pressed portion 22 located therebetween. In addition, in the section of the surface of the elongated material 1 that is pressed by a section in which the long-side surface 45 of an embossing portion 41a faces the long-side surface 45 of an embossing portion 41b, steep inclined surfaces, which are almost vertical, are formed on opposite sides of a non-heat-pressed portion 22. The embossing roll 11 of the first embodiment includes the steps 44 in the embossing portions 41, and the steps 44 of the embossing portions 41a differ from the steps 44 of the embossing portions 41b in orientation. This allows for intricate formation of inclined surfaces of different gradients in the surface of the elongated material 1. As a result, the shine on the surface of the covering material P appears differently when viewed from different directions, which achieves a complex surface shape and improved aesthetic appearance.

Figure 6B:
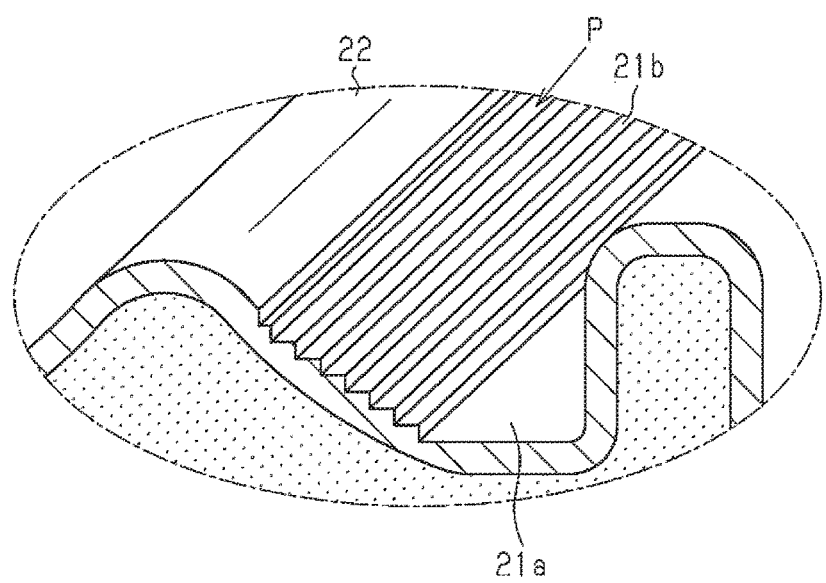
FIG. 6B is an enlarged partial perspective view showing a section of the seat covering material.

As shown in FIG. 6B, in the microscopic sense, each second heat-pressed portion 21b includes minute steps formed when pressed by steps 44. However, these minute steps are perceived as fine lateral lines formed in the gently inclined surface of the second heat-pressed portion 21b. This achieves a pattern that cannot be formed by the conventional embossing process and thus improves the aesthetic appearance.

Each of the embossing portions 41a and 41b has a complex shape in which a plurality of steps 44 is arranged between the top surface 43 and the base surface 42. Accordingly, the embossed pattern formed by the embossing portions 41a and 41b has a complex three-dimensional shape. The shape and size of the steps 44 may be changed to change the area of the second heat-pressed portion 21b and the shape of the inclined surface of the second heat-pressed portion 21b so as to adjust the gradient of the second heat-pressed portion 21b. In addition, the orientation of steps 44 of the embossing portions 41a differs from the orientation of steps 44 of the embossing portions 41b so that the steps 44 face toward each other. This forms the section in which second heat-pressed portions 21b are adjacent to each other with a non-heat-pressed portion 22 located therebetween and the section in which first heat-pressed portions 21a are adjacent to each other with a non-heat-pressed portion 22 located therebetween. As a result, the embossed pattern varies by section in the covering material P. This advantage is achieved by applying fine processing to the embossing portions 41 of the embossing roll 11 instead of using a simple shape like the embossing portion 102 of the conventional embossing roll. Forming additional minute projections and depressions in the embossing portion 41 achieves an embossed pattern with enhanced variety.

With the method described above, the covering material P having an embossed pattern of complex three-dimensional appearance can be obtained by passing the elongated material 1 between the embossing roll 11 and the flat roll 12.

Referring to FIGS. 3A to 5, the operation of the first embodiment will now be described.

The embossing portions 41, each including a plurality of steps 44, are formed on the base surface 42 of the embossing roll 11. Since each embossing portion 41 includes a plurality of steps 44, in the embossing process, the surface of the outer material 2 of the elongated material 1 is pressed not only by the flat top surface 43 of the embossing portion 41 but also by the steps 44. As such, the heat-pressed portions 21 formed in the outer material 2 of the elongated material 1 include the first heat-pressed portions 21a, which are pressed with strong force by the top surfaces 43 of the embossing portions 41, and the second heat-pressed portions 21b, which are pressed with less force by the steps 44 of the embossing portions 41. Each first heat-pressed portion 21a forms the flat bottom surface of the depression 20, and each second heat-pressed portion 21b forms a gently inclined surface extending from the bottom surface of the depression 20 to the non-heat-pressed portion 22. The steps 44 of the embossing portions 41 form gently inclined surfaces in the surface of the elongated material 1.

Figure 12:
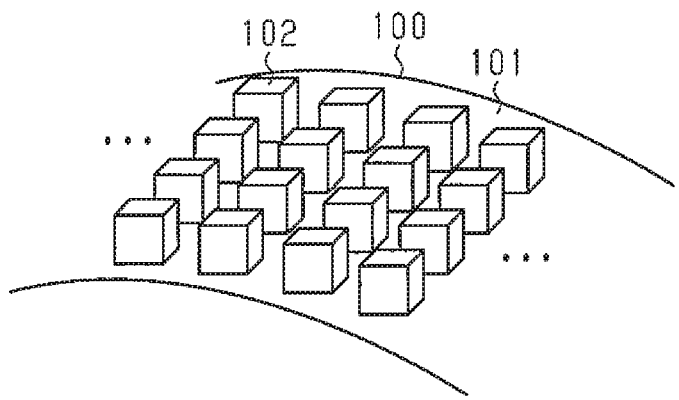
FIG. 12 is a schematic view showing a conventional embossing roll.
Figure 13A:
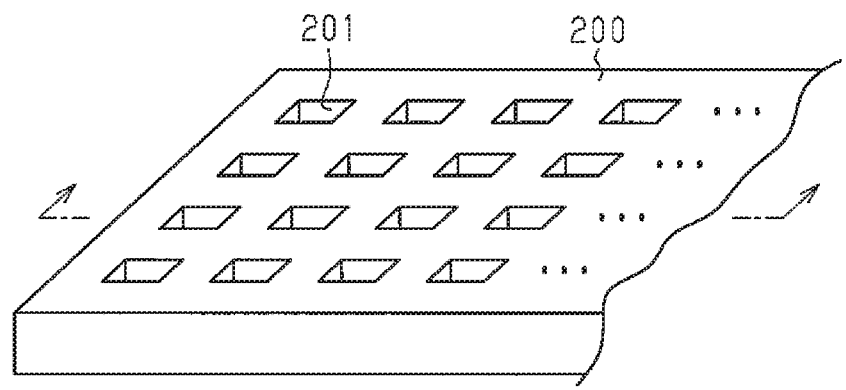
FIG. 13A is a perspective view showing a conventional seat covering material.
Figure 13B:
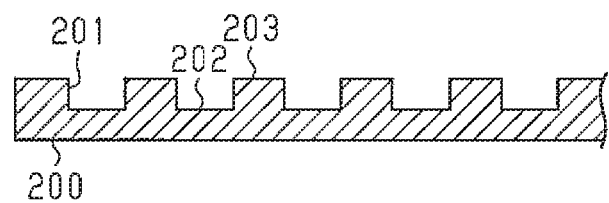
FIG. 13B is a cross-sectional view showing the seat covering material.

As shown in FIG. 12, the conventional embossing process presses the lamination sheet 200 with embossing portions 102 having the shape of a rectangular solid. In contrast, the embossing portions 41 of the first embodiment include steps 44. Thus, in the embossing process of the first embodiment, the proportion of the area of the first heat-pressed portions 21a, which are pressed with strong force by the top surfaces 43, is less than the proportion of the area of the heat-pressed portions 202 of the conventional embossing process. That is, the area of the section that completely presses the covering material P is reduced. This increases the thickness of the non-heat-pressed portions 22 compared to the conventional non-heat-pressed portions, thereby increasing the difference between the height of the first heat-pressed portions 21a and the height of the non-heat-pressed portions 22.

Figure 7A:
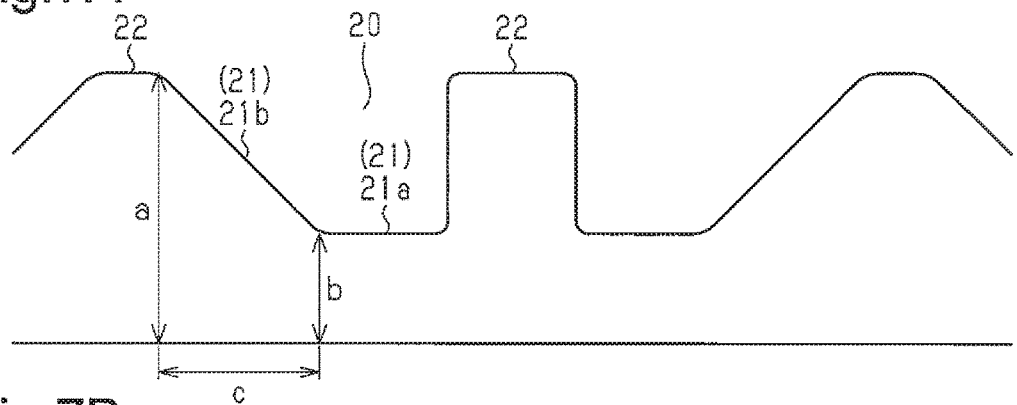
FIGS. 7A to 7D are schematic views showing the shapes of heat-pressed portions.

As shown in FIG. 7A, when the thickness of the non-heat-pressed portions 22 of the covering material P is A, and the thickness of the first heat-pressed portions 21a formed in the surface of the covering material P is B, the covering material P obtained in the first embodiment satisfies the following relation:

$$2 \leq A/B \leq 6 \quad (1)$$

As such, the height of the non-heat-pressed portions 22 relative to the height of the first heat-pressed portions 21a is increased, providing a distinct embossed pattern.

Further, when the horizontal extent of the second heat-pressed portion 21b, that is, the horizontal distance between an end of the first heat-pressed portion 21a and an end of the non-heat-pressed portion 22, is C, the shape of the second heat-pressed portion 31b may satisfy the following relation:

$$0.2 \leq (A-B)/C \leq 2 \quad (2)$$

Here, (A–B)/C represents the shape of the inclined surface of the second heat-pressed portion 21b. When the range of values of (A–B)/C is from 0.2 to 2, the inclined surface of the second heat-pressed portion 21b forms a gentle slope. In the first embodiment, the steps 44 formed in the embossing portion 41 allow the inclined surface of the second heat-pressed portion 21b to satisfy such a range of values.

In addition, the embossing roll 11 and the flat roll 12 are both heated for embossing. This forms the heat-pressed portions 21 more clearly than the embossing process that heats only the embossing roll 11. Further, adhesion of the covering material P in the first heat-pressed portions 21a is less likely to occur. For example, in the first embodiment in which the elongated material 1 of a thickness of about 6 mm is embossed by engaging the embossing portions 41 into the elongated material 1 by about 4 mm, the thickness B of the first heat-pressed portions 21a satisfies the following range of values:

$$1 \text{ mm} \leq B \leq 3 \text{ mm} \quad (3)$$

Figure 7B:
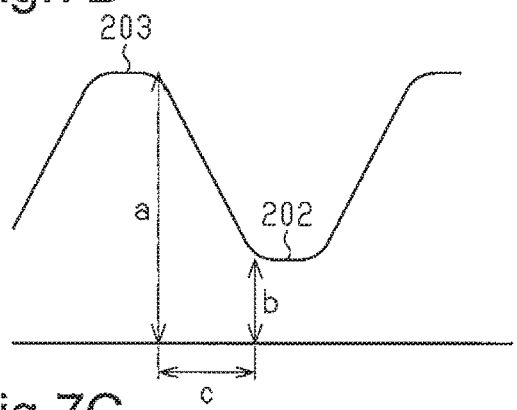
Figure 7C:
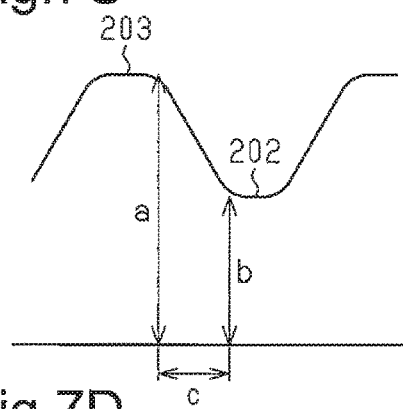
Figure 7D:
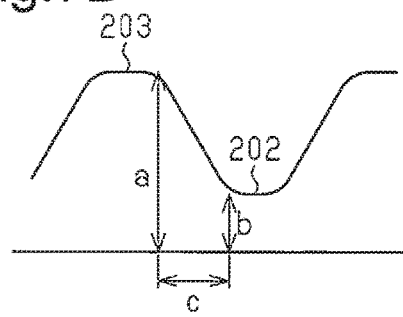

In contrast, the conventional embossing process uses the embossing portions 102 that have the shape of a rectangular solid and thus includes only the flat heat-pressed portions 202 and the non-heat-pressed portions 203 as shown in FIG. 7B. This results in steep side surfaces of the depressions. Further, when only the embossing roll is heated and the flat roll is not heated for embossing, the pressing of the heat-pressed portions 202 may not be sufficient and the embossed pattern may be unclear as shown in FIG. 7C, or adhesion of the heat-pressed portions 202 may occur as shown in FIG. 7D.

In the embossing process of the first embodiment, the embossing portion 41 includes a plurality of steps 44, and both the embossing roll 11 and the flat roll 12 are heated. This forms a clear embossed pattern with distinct unevenness in the surface. In addition, the surface includes inclined surfaces of different gradients, thereby giving a complex three-dimensional appearance to the embossed pattern.

The advantages of the first embodiment will now be described.

(1) The steps 44 formed in the embossing portions 41 form gently inclined surfaces in the elongated material 1. This achieves a more complex embossed pattern compared with the conventional embossing process.

(2) The shape, such as height and size, and the position of the steps 44 in each embossing portion 41 may be changed to set the gradient and formation position of the inclined surface. In addition, the embossing portions 41 may have steps 44 with various shapes in various positions so that the resulting heat-pressed portions 21 have different shapes. Designing the embossing portions 41 of complex shape results in formation of a complex embossed pattern in the surface of the elongated material 1, enabling manufacturing of a covering material P with enhanced aesthetic appearance.

(3) Since each embossing portion 41 includes steps 44, each depression 20 in the surface of the covering material P includes a plurality of inclined surfaces of different gradients. The inclined surfaces formed in the depression 20 cause the shape of the depression 20 to be perceived differently when viewed from different angles. This varies the degree of light reflection and shine, allowing the depression 20 to be perceived to have a complex three-dimensional appearance. A plurality of such depressions 20 formed in the surface of the covering material P gives the entire surface of the covering material P a complex three-dimensional appearance. This achieves a covering material P with enhanced aesthetic appearance.

(4) In the microscopic sense, the second heat-pressed portion 21b, which is formed by the steps 44 of the embossing portion 41, includes minute steps. However, these minute steps are perceived as fine lateral lines formed in the gently inclined surface. This achieves a pattern that cannot be formed by the conventional embossing process and thus improves the aesthetic appearance of the surface of the covering material P.

(5) Both the embossing roll 11 and the flat roll 12 are heated. Thus, even if the temperature of the embossing roll 11 is lowered, the elongated material 1 is maintained at a temperature suitable for embossing. This forms a deep, clear embossed pattern.

(6) Heating both the embossing roll 11 and the flat roll 12 allows the temperature on the outer material 2 of the covering material P to be lowered, reducing effect of heat on the outer material 2. Thus, the surface of the outer material 2 of the elongated material 1 is less likely to have undesirable shine or discolorations.

(7) The embossing roll 11 and the flat roll 12 are controlled by respective heating mechanisms 13 and 14. This allows the heating temperatures of the embossing roll 11 and the flat roll 12 to be controlled individually according to various conditions of embossing process. The heating temperatures of the rolls can be set individually according to various conditions including the materials of the outer material 2 and the backing material 3, the shape of the embossing portions 41 formed in the embossing roll 11, the unevenness of the embossed pattern to be formed, and the operation speed of the embossing roll 11 and the flat roll 12, for example.

(8) The positional relationship between the embossing roll 11 and the flat roll 12 is set so as not to bring the base surface 42 of the embossing roll 11 into contact with the surface of the outer material 2 of the elongated material 1. This prevents the non-heat-pressed portions 22 from being affected by the heat of the embossing roll 11 so that the surface of the outer material 2 of the covering material P is less likely to have undesirable shine, discolorations, or change in tactile feeling. This maintains the texture of the outer material 2 of the elongated material 1 and forms the covering material P with an enhanced aesthetic quality.

Second Embodiment

Referring to FIGS. 8A to 11, a second embodiment of the present invention will now be described.

In the second embodiment, the shape of the embossing portions 51 of the embossing roll 50 differs from the shape of the embossing portions 41 of the first embodiment. Since the other structures are the same as the first embodiment, the following descriptions mainly focus on the shape of the embossing portions 51.

Figure 9:
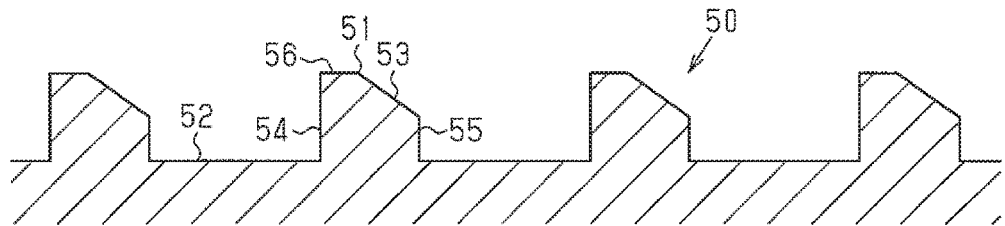
FIG. 9 is an enlarged partial cross-sectional view showing embossing portions of the embossing roll.

As shown in FIG. 8A, the embossing roll 50 has a base surface 52 from which a plurality of embossing portions 51 projects. The embossing portions 51 are arranged continually in the axial direction of the embossing roll 50 over the entire length of the embossing roll 50. As shown in FIGS. 8B and 9, each embossing portion 51 includes a long-side surface 54 and a short-side surface 55, which extend perpendicularly from the base surface 52 of the embossing roll 50. The section of the embossing portion 51 that is farthest from the base surface 52 forms a flat top surface 56, which is substantially parallel to the base surface 52. In this embodiment, the height of the top surface 56 from the base surface 52, that is, the height of the long-side surface 54, is about 5 mm. The long-side surface 54 is connected to the top surface 56, and a bevel 53 is formed between the short-side surface 55 and the top surface 56. The bevel 53 extends over the entire axial length of the embossing portion 51. The height of the bevel 53 from the base surface 52, that is, the height of the short-side surface 55, is about 3 mm. Further, the axial length of each embossing portion 51 is about 20 mm.

As shown in FIG. 8B, the embossing portions 51 extending in the axial direction include continual embossing portions 51a, each including a bevel 53 facing toward one circumferential direction of the embossing roll 50, and embossing portions 51b, each including a bevel 53 facing toward the opposite circumferential direction. Each bevel 53 is formed by cutting out a section of a rectangular parallelepiped. The embossing portions 51a and the embossing portions 51b are identical in shape and size and positioned such that their top surfaces 56 are aligned in the axial direction. A clearance of about 1 mm is formed between the embossing portion 51a and the embossing portion 51b that are continual in the axial direction.

As shown in FIGS. 8B and 9, of the plurality of projecting embossing portions 51, the embossing portions 51 that are adjacent in the axial direction of the embossing roll 50 are formed such that the embossing portions 51a and the embossing portions 51b alternate so that the bevels 53 face toward opposite circumferential directions. That is, when an imaginary line is drawn along the axial direction of the embossing roll 50, the bevels 53 of adjacent embossing portions 51a and 51b are inclined in different orientations with respect to the imaginary line. The embossing portions 51 that are adjacent to each other in the circumferential direction of the embossing roll 50 are the same embossing portions 51a or the same embossing portions 51b so that their bevels 53 face toward the same circumferential direction.

Figure 10:
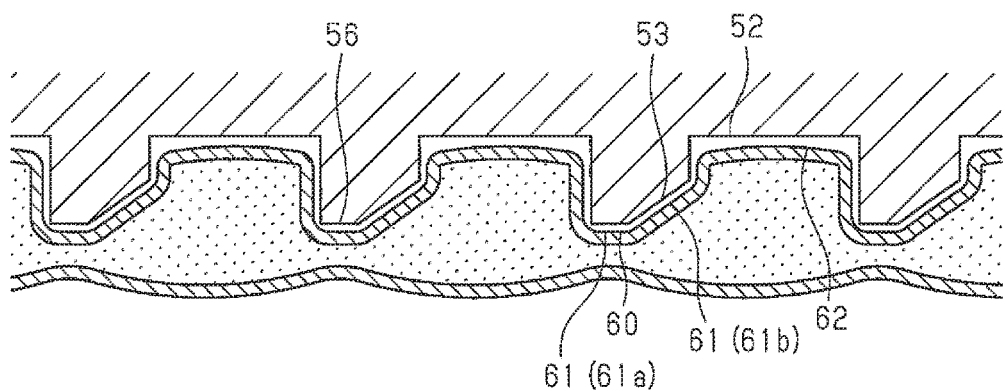
FIG. 10 is a schematic view showing an elongated material pressed by the embossing roll.

As shown in FIG. 10, the embossing portions 51 formed in the embossing roll 50 include bevels 53. Thus, although the top surface 56 of each embossing portion 51 firmly presses the outer material 2 of the elongated material 1, the bevel 53 of the embossing portion 51 presses the outer material 2 of the elongated material 1 with force that varies with height. In each of the depressions 60, which are formed by pressing the surface of the outer material 2 of the elongated material 1 with the embossing portions 51, the section that is pressed by the top surface 56 is referred to as a first heat-pressed portion 61a, and the section pressed by the bevel 53 is referred to as a second heat-pressed portion 61b. The first heat-pressed portion 61a and the second heat-pressed portion 61b are collectively referred to as a heat-pressed portion 61. Further, the section of the surface of the outer material 2 of the elongated material 1 that corresponds to the base surface 52 of the embossing roll 50 and is thus not pressed is referred to as a non-heat-pressed portion 62.

Figure 11:
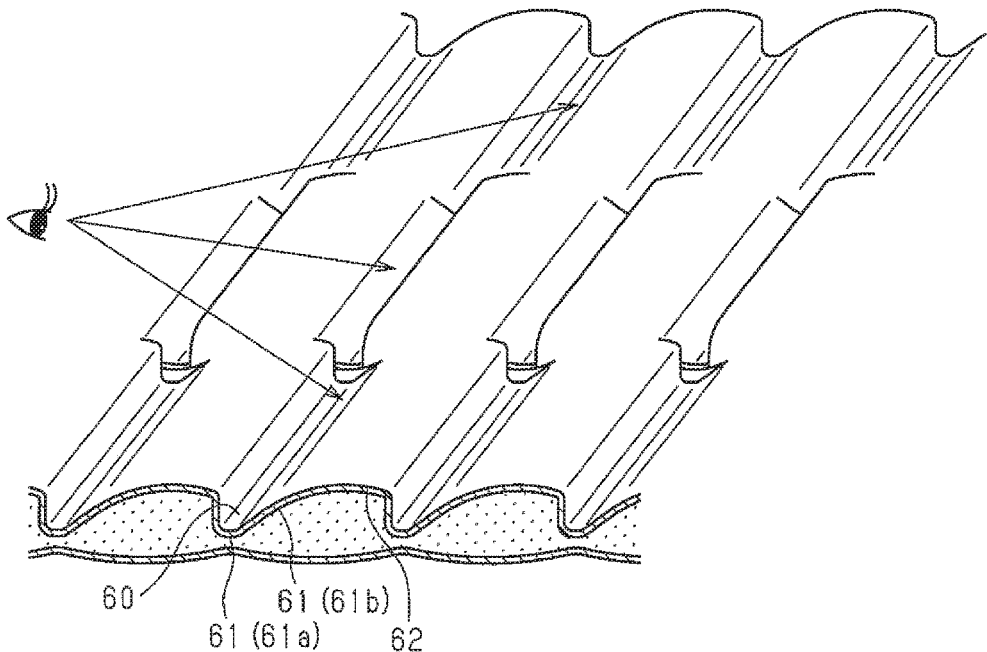
FIG. 11 is a perspective view showing a seat covering material of the second embodiment.

As shown in FIGS. 10 and 11, the first heat-pressed portions 61a, which are firmly pressed by the top surfaces 56 of the embossing portions 51, form the flat bottom surfaces of the depressions 60. The effects of heat from the heated embossing roll 50 and the strong pressing force from the top surfaces 56 fuse the outer material 2, the backing material 3, and the cushion material 4 together, thereby reducing the thickness of the elongated material 1. In addition, a steep inclined surface, which is almost vertical, is formed between the first heat-pressed portion 61a and the non-heat-pressed portion 62.

In contrast, the second heat-pressed portions 61b, which are pressed with less force by the bevels 53 of embossing portions 51, form inclined surfaces, which are relatively gentle, in the depressions 60. The effects of heat from the heated embossing roll 50 and the pressing force from the bevels 53 cause fusion in the same manner as the first heat-pressed portions 61a. However, the biting of the embossing portions 51 into the outer material 2 and thus the pressing force applied to the outer material 2 are reduced in the sections where the bevels 53 are formed. This results in the second heat-pressed portions 61b having a greater thickness than the first heat-pressed portions 61a. Since the height of the bevel 53 varies gradually, the degree of resulting fusion also varies gradually. As a result, the second heat-pressed portion 61b forms a gently inclined surface.

Consequently, as shown in FIG. 11, the depressions 60 of the embossed elongated material 1 (covering material P) include inclined surfaces that vary depending on section.

As shown in FIG. 11, in the depressions 60 that are adjacent in the axial direction in the covering material P, the first heat-pressed portions 61a are aligned in the axial direction, and the second heat-pressed portions 61b are located on different sides. The embossing roll 50 of the second embodiment includes the bevels 53 in the embossing portions 51, and the orientation of the bevels 53 of the embossing portions 51a differs from the orientation of the bevels 53 of the embossing portions 51b. This allows for intricate formation of inclined surfaces of different gradients in the surface of the elongated material 1. As a result, the shine on the surface of the covering material P appears differently when viewed from different directions, achieving complex surface perception and improved aesthetic appearance.

The second embodiment achieves advantages (1) to (8) of the first embodiment.

The embodiments described above may be modified as follows. Further, the following modified examples may be combined.

The shape, size, and number of the embossing portions 41 formed in the embossing roll 11 and the values relating to the steps 44 formed in the embossing portions 41, such as the number, depth, and height of the steps 44, are not limited to those set in the first embodiment. The shape, size, number, and the like may be set according to the surface shape of the elongated material 1 to be manufactured. Further, the size and the thickness of the elongated material 1 may be changed.

In the first embodiment, five steps 44 that are identical in size and shape are formed. However, the steps 44 may be different from one another in shape or size.

The first embodiment includes steps 44 between the short-side surface 46 and the top surface 43 of each embossing portion 41. However, steps 44 may be formed both between the short-side surface 46 and the top surface 43 and between the long-side surface 45 and the top surface 43.

The steps 44 of the first embodiment and the bevel 53 of the second embodiment may be formed in one embossing portion.

In the first embodiment, every embossing portion 41 includes steps 44. In second embodiment, every embossing portion 51 includes a bevel 53. However, steps 44 may be formed only in some of the embossing portions 41, and bevels 53 may be formed only in some of the embossing portions 51.

The heat-pressed portion 21 of the first embodiment includes the first heat-pressed portion 21a and the second heat-pressed portion 21b, and the heat-pressed portion 61 of the second embodiment includes the first heat-pressed portion 61a and the second heat-pressed portion 61b. However, the first embodiment may further include third and fourth heat-pressed portions and the like that differ from the first heat-pressed portion 21a and the second heat-pressed portion 21b in thickness. In addition, the second embodiment may further include third and fourth heat-pressed portions and the like that differ from the first heat-pressed portion 61a and the second heat-pressed portion 61b in thickness. Heat-pressed portions with different thicknesses may be formed adjacent to each other.

In the second embodiment, the embossing portions 51a and 51b are formed continually in the axial direction of the embossing roll 50 such that the top surfaces 56 of the embossing portions 51a and 51b are aligned in the axial direction. However, the embossing portions 51a and 51b may be formed alternately such that the embossing portions 51a are offset from the embossing portions 51b in the circumferential direction.

The embossing portion 41 of the first embodiment includes steps 44, and the embossing portion 51 of the second embodiment includes the bevel 53. However, the embossing portions may have other shape. For example, a depression may extend from a section of the top surface of an embossing portion, a projection may extend from a section of the top surface of an embossing portion, or a plurality of grooves may be formed in an embossing portion. Any of the examples described above may be identified as a shape formed by adding a different structure to an embossing portion or by engraving a minute structure on an embossing portion. Forming the embossing portions of a complex shape in the embossing roll results in a complex embossed pattern formed in the surface of the elongated material. This achieves a seat covering material having an excellent aesthetic appearance.

The technical concepts described below may be recognized from the embodiments described above.

(a) A method for manufacturing a seat covering material, wherein a plurality of embossing portions each includes a bevel that varies in height from a base surface of the heating embossing roll, of the plurality of embossing portions, the embossing portions that are adjacent in the axial direction of the heating embossing roll have bevels that are inclined in different directions, and the plurality of embossing portions presses the elongated material.

(b) A method for manufacturing a seat covering material, wherein the elongated material is pressed by the embossing portions, each including a depression that varies in height from the base surface of the heating embossing roll.

(c) A method for manufacturing a seat covering material, wherein the elongated material is pressed by the embossing portions, each including a projection that varies in height from the base surface of the heating embossing roll.

DESCRIPTION OF THE REFERENCE NUMERALS

1: elongated material, 11: embossing roll (heating embossing roll), 12: flat roll (heating flat roll), 21: heat-pressed portion, 21a: first heat-pressed portion, 21b: second heat-pressed portion, 41: embossing portion, 42: base surface, 44: step, 50: embossing roll (heating embossing roll), 51: embossing portion, 53: bevel.

The invention claimed is:

1. A method for manufacturing a seat covering material, the method comprising a step of
passing an elongated material between a heating embossing roll, which includes a plurality of embossing portions projecting from a base surface, and a heating flat roll so that the elongated material is pressed by the embossing portions, wherein:
(a) at least some embossing portions of the plurality of embossing portions are formed to have a height from the base surface of the heating embossing roll that varies by section, and the elongated material is pressed by the plurality of embossing portions;
each embossing portion of the at least some embossing portions includes:
(i) a long-side surface and a short-side surface, which extend from the base surface, the long-side surface extending a longer distance from the base surface than the short-side surface;
(ii) a top surface formed on a section that is farthest from the base surface; and
(iii) a bevel formed between the top surface and the short-side surface, wherein
the bevel varies in height from the base surface;
(b) the at least some embossing portions include a group of embossing portions arranged along an imaginary line on the base surface, the imaginary line being oriented in the axial direction of the heating embossing roll;
(c) the bevels of adjacent embossing portions in the group of embossing portions are inclined in different orientations with respect to the imaginary line; and
(d) the plurality of embossing portions have the same height from the base surface to the top surface of each embossing portion in the plurality of embossing portions.

2. A method for manufacturing a seat covering material, the method comprising a step of passing an elongated material between a heating embossing roll, which includes a plurality of embossing portions projecting from a base surface, and a heating flat roll so that the elongated material is pressed by the embossing portions, wherein:
(a) at least some embossing portions of the plurality of embossing portions are formed to have a height from the base surface of the heating embossing roll that varies by section, and the elongated material is pressed by the plurality of embossing portions;
(b) each embossing portion of the at least some embossing portions includes:
(i) long-side surface and a short-side surface, which extend from the base surface, the long-side surface extending a longer distance from the base surface than the short-side surface;
(ii) a top surface formed on a section that is farthest from the base surface; and
(iii) a plurality of steps formed between the top surface and the short-side surface, each of the steps having a depth and height;
(c) the steps of adjacent embossing portions face toward each other, and the long-side surfaces of adjacent embossing portions face each other; and
(d) the plurality of embossing portions have the same height from the base surface to the top surface.

3. The method for manufacturing a seat covering material according to claim 2,
wherein the base surface of the heating embossing roll remains out of contact with the elongated material when the elongated material passes between the heating embossing roll and the heating flat roll.

4. The method for manufacturing a seat covering material according to claim 2,
wherein each embossing portion includes a depression that varies in height from the base surface.

5. The method for manufacturing a seat covering material according to claim 2,
wherein each embossing portion includes a projection that varies in height from the base surface.

6. A heating embossing roll used to manufacture a seat covering material, comprising:
a plurality of embossing portions projecting from a base surface, wherein:
(a) at least some embossing portions of the plurality of embossing portions are formed to have a height from the base surface of the heating embossing roll that varies by section, and the elongated material is pressed by the plurality of embossing portions;
(b) each embossing portion of the at least some embossing portions includes:
(i) a long-side surface and a short-side surface, which extend from the base surface, the long-side surface extending a longer distance from the base surface than the short-side surface;
(ii) a top surface formed on a section that is farthest from the base surface; and
(iii) a plurality of steps formed between the top surface and the short-side surface, each of the steps having a depth and height;
(c) the steps of adjacent embossing portions face toward each other, and the long-side surfaces of adjacent embossing portions face each other; and
(d) the plurality of embossing portions have the same height from the base surface to the top surface.

7. A heating embossing roll used to manufacture a seat covering material, comprising:
a plurality of embossing portions projecting from a base surface, wherein:
(a) at least some embossing portions of the plurality of embossing portions are formed to have a height from the base surface of the heating embossing roll that varies by section, and the elongated material is pressed by the plurality of embossing portions; each embossing portion of the at least some embossing portions includes:
(i) a long-side surface and a short-side surface, which extend from the base surface, the long-side surface extending a longer distance from the base surface than the short-side surface;
(ii) a top surface formed on a section that is farthest from the base surface; and
(iii) a bevel formed between the top surface and the short-side surface, wherein the bevel varies in height from the base surface;
(b) the at least some embossing portions include a group of embossing portions arranged along an imaginary line on the base surface, the imaginary line being oriented in the axial direction of the heating embossing roll;
(c) the bevels of adjacent embossing portions in the group of embossing portions are inclined in different orientations with respect to the imaginary line; and
(d) the plurality of embossing portions have the same height from the base surface to the top surface of each embossing portion in the plurality of embossing portions.

* * * * *